United States Patent [19]
Green

[11] Patent Number: 6,101,990
[45] Date of Patent: *Aug. 15, 2000

[54] LOW EMISSION POWER PLANT AND METHOD OF MAKING SAME

[75] Inventor: Edward Green, Bakersfield, Calif.

[73] Assignee: Clean Cam Technology Systems, Bakersfield, Calif.

[*] Notice: This patent is subject to a terminal disclaimer.

[21] Appl. No.: 09/165,178

[22] Filed: Oct. 1, 1998

Related U.S. Application Data

[63] Continuation-in-part of application No. 09/140,356, Aug. 24, 1998, which is a continuation-in-part of application No. 09/030,659, Feb. 25, 1998, which is a continuation of application No. 08/721,232, Sep. 26, 1996, Pat. No. 5,746,163.

[51] Int. Cl.[7] .................................................. F02B 75/02

[52] U.S. Cl. ............................... 123/65 VC; 123/65 BA; 123/568.14

[58] Field of Search ........................ 123/65 VC, 65 R, 123/65 W, 65 P, 68, 73 C, 65 BA, 568.14, 276

[56] References Cited

U.S. PATENT DOCUMENTS

| | | | |
|---|---|---|---|
| 2,205,493 | 6/1940 | Saurer | 123/276 |
| 2,991,616 | 7/1961 | Miller | 60/13 |
| 3,020,898 | 2/1962 | Hartmann | 123/276 |
| 4,018,194 | 4/1977 | Mitchell et al. | 123/276 |
| 4,176,628 | 12/1979 | Kanai et al. | 123/276 |
| 4,207,843 | 6/1980 | List et al. | 123/276 |
| 4,676,208 | 6/1987 | Moser et al. | 123/276 |
| 5,746,163 | 5/1998 | Green | 123/65 VC |
| 5,899,178 | 5/1999 | Green | 123/65 VC |

*Primary Examiner*—Henry C. Yuen
*Assistant Examiner*—Brian Hairston
*Attorney, Agent, or Firm*—James E. Brunton

[57] ABSTRACT

A low emission power generating apparatus which comprises a modified two-stroke diesel engine component and a modified turbocharger component which has a relatively low aspect ratio. The diesel engine component is a modification of a conventional two-stroke diesel engine design and includes a modified connecting rod assembly which causes a modified piston to accelerate rapidly within the combustion chamber and an exhaust valve cam of unique design that has a cam profile which results in a later than-normal exhaust valve opening and an earlier-than-normal valve closing so that the time during which the exhaust valve remains open is shorter than normal, thereby causing a substantially greater volume of residual gases to remain in the combustion chamber following the scavenge stroke. This increase in the volume of the residual exhaust gases within the chamber leads to an increase in compression temperature and effectively increases the compression ratio and consequently the compression pressure. Because of the heat absorption capacity of these residual exhaust gases, the exhaust gases remaining in the chamber following the scavenge stroke tend to absorb combustion heat and thereby effectively reduce the peak combustion temperature. This reduction in peak combustion temperature advantageously results in the lower than normal formation of nitrogen oxide (NOx) and, therefore, allows advancement of the injection timing, while still maintaining the NOx emissions coming from the engine lower than those legislatively mandated. Advantageously, the advance in injection timing, which increases NOx emissions, by definition has the effect of also reducing particulate matter emissions. Thus, by increasing the volume of residual exhaust gases within the cylinder, substantial particulate matter emission reductions can be achieved, while at the same time maintaining NOx emissions well below mandated limits. The modified turbocharger component provides an additional charge of oxygen-rich air into the combustion chamber which effectively increases the compression pressure, which, in turn, leads to an earlier start of combustion because of the combustible mixture reaching its auto-ignition temperature at an earlier point in the cycle. This phenomenon leads to more thorough combustion of the fuel and also generally leads to higher exhaust temperatures. Higher exhaust temperatures, in turn, lead to a greater oxidation rate of the soluble organic fraction thus lowering the level of emission from the engine of undesirable particulate matter.

13 Claims, 9 Drawing Sheets

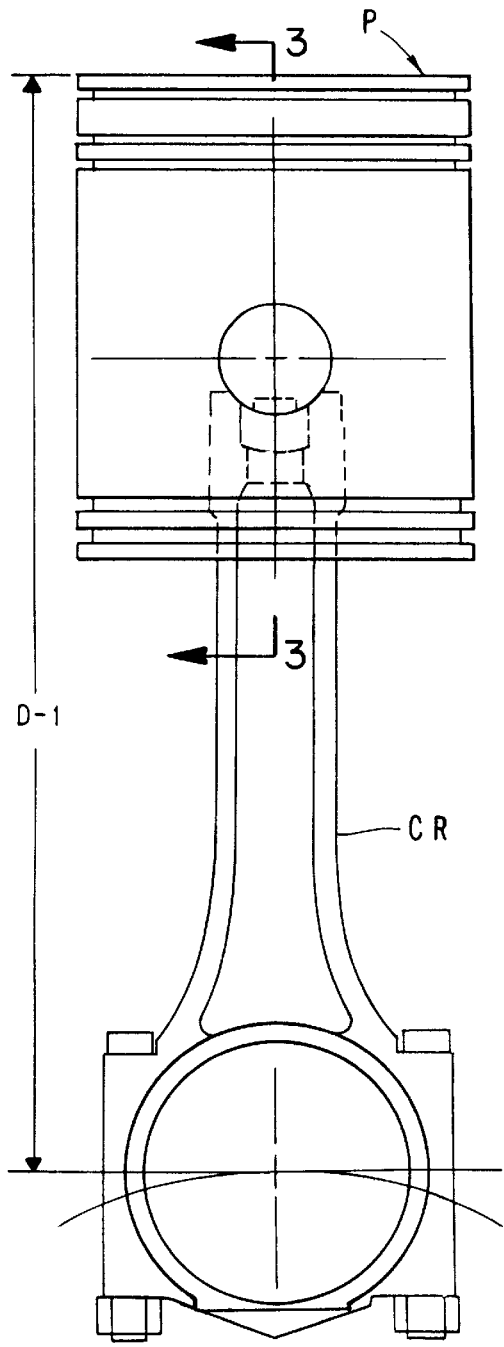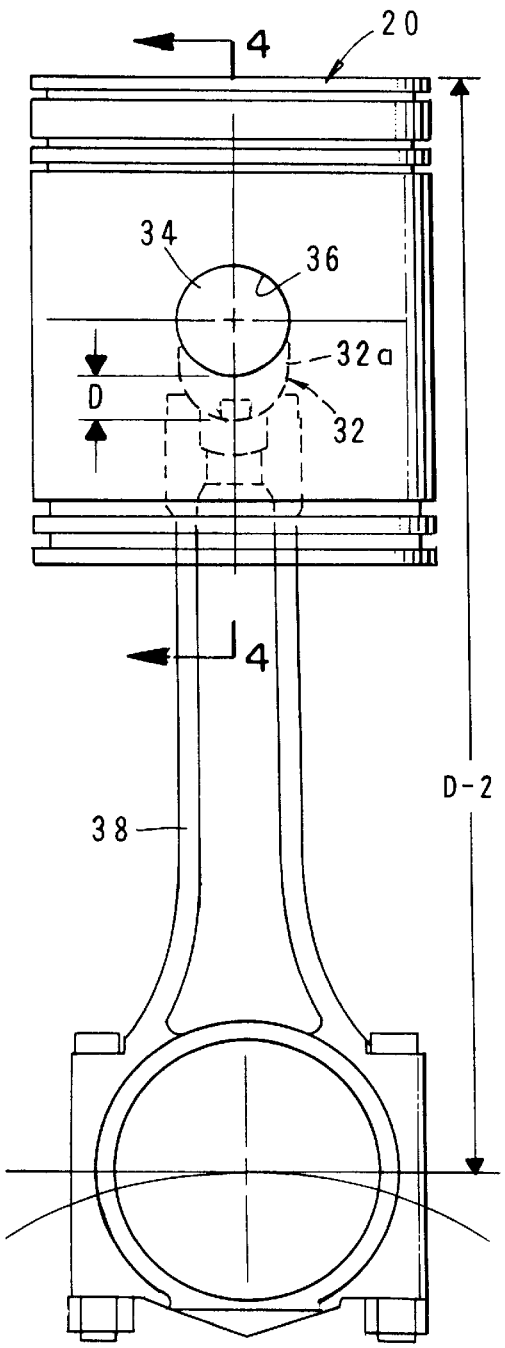
FIG. 1
PRIOR ART
FIG. 2

LOW EMISSION POWER PLANT AND METHOD OF MAKING SAME

BACKGROUND OF THE INVENTION

This is a Continuation-in-Part of application Ser. No. 09/140,356 filed on Aug. 24, 1998, which is Continuation-In-Part of co-pending application Ser. No. 09/030,659 filed on Feb. 25, 1998, which is a Continuation application of application Ser. No. 08/721,232 filed Sep. 26, 1996 and now U.S. Pat. No. 5,746,163.

FIELD OF THE INVENTION

The present invention relates generally to mechanical power plants. More particularly, the invention concerns a low emission power plant which comprises a modified diesel engine component and a modified turbocharger component which has a relatively low turbocharger aspect ratio. The diesel engine component is a modification of a two-stroke, uniflow-scavenge diesel engine design and includes a modified piston and connecting rod of novel design and also includes an exhaust valve cam of novel design that has a cam profile which results in a later-than-normal exhaust valve opening and an earlier-than-normal valve closing so that the time during which the exhaust valve remains open is shorter than normal thereby causing a substantially greater volume of residual gases to remain in the combustion chamber following the scavenge stroke.

DISCUSSION OF THE PRIOR ART

Mechanical power plants embodying diesel engines are widely used in both on-road and off-road applications. Such power plants have always been popular for use in large trucks. However, such power plants have also been used extensively for off-road applications such as in earth moving equipment, in road graders and in stationary applications in connection with water and oil well drilling and pumping apparatus and many other applications.

Diesel engines are designed to operate on the two-stroke or on the four-stroke principle as are gasoline engines. In the two-stroke engine, intake and exhaust take place during part of the compression. A four-stroke engine requires four piston strokes to complete an operating cycle and thus, during one-half of its operation, the four-cycle engine functions merely as an air pump. The present invention is directed primarily, but not exclusively, to use with two-stroke engines.

While diesel engines are durable, reliable, and economical, the control of emissions from such engines has presented substantial problems. Accordingly, extensive research has been directed toward making the diesel engine burn ever cleaner so as to meet seemingly ever increasing emission control requirements imposed by state and federal legislation. In this regard, substantial experimentation has been in the areas of electrical and electronics monitoring and control. However, the thrust of the present invention is directed to effectively decreasing emissions from diesel engine power plants by mechanical means using, for the most part specially modified, generally commercially available components. One such power plant is disclosed in U.S. Pat. No. 5,746,163 which issued to the present inventor on May 5, 1998. The present invention comprises an improvement to the invention disclosed in this patent and is pertinent to a full understanding of the present application. Therefore, U.S. Pat. No. 5,746,163 is hereby incorporated by reference as though fully set forth herein.

As will be better appreciated from the discussion which follows, emissions from the improved mechanical power plant of the present invention are quite low. For example, the current legislatively mandated levels of hydrocarbon emissions require that hydrocarbon emissions be no greater than 1.3 grams per horsepower-hour (g/bhp-hr.). It is expected, based on previous testing that hydrocarbon emissions of the further modified apparatus of the present invention will be less than 0.54 g/bhp-hr, which is, of course, obviously substantially less than the generally accepted regulatory level. Similarly, it is expected that particulate emissions from the apparatus of the invention will be substantially less than the legislatively mandated limit of 0.1 grams per brake horsepower-hour (g/bhp-hr.) and will be less than 0.08 g/bhp-hr. Additionally, it is expected that carbon monoxide emissions will be less than 0.6 g/bhp-hr. and that, during normal operation, NOx emissions will be comfortably lower than the legislatively mandated level of 10.7 g/bhp-hr.

SUMMARY OF THE INVENTION

As previously mentioned, the thrust of the present invention is directed toward achieving a substantial reduction in harmful exhaust emissions from diesel engines by mechanical rather than electrical or electronic means and, for the most part, involves the use of specially modified conventional components. In this regard, one form of the improved power plant of the present invention comprises a modification of a power plant which is commercially available from the Detroit Diesel Corporation and includes both a specially modified diesel engine component and a specially modified turbocharger component.

By way of brief summary, the invention involves a two prong approach to the effective reduction of harmful exhaust emissions from conventional diesel engines. The first prong of the approach involves the strategic redesign of four of the major components of the baseline engine, namely the piston, the connecting rod, the exhaust cam profile and the cylinder liner. Among other things, these modification cause an increase in the volume of residual exhaust gases that remain in the cylinder during the compression, combustion and power strokes. This increase in the volume of the residual exhaust gases within the cylinder leads to an increase in compression temperature and effectively increases the compression ratio and consequently the compression pressure. Because of the heat absorption capacity of these residual exhaust gases, the exhaust gases remaining in the cylinder, following the scavenge stroke, tend to absorb combustion heat and thereby effectively reduce the peak combustion temperature. This reduction in peak combustion temperature advantageously results in the lower than normal production of nitrogen oxide (NOx) and, therefore, allows advancement of the injection timing, while still maintaining the NOx emissions coming from the engine lower than those legislatively mandated. Advantageously, the advance in injection timing, which increases NOx emissions will, in accordance with the well understood NOx versus particulate matter tradeoffs, also have the effect of reducing particulate matter emissions. Thus, by increasing the volume of residual exhaust gases within the cylinder, significant particulate matter emission reductions can be achieved, while at the same time maintaining NOx emissions well below acceptable levels.

The second prong of the inventive approach involves modification of the turbocharger component of the apparatus in a manner to provide additional oxygen to the combustion process. The provision of additional oxygen to the heated combustion chamber of the engine accelerates the oxidation of the soluble organic fraction contained within the chamber which is a major component of the undesirable particulate matter emissions. More specifically, the additional charge of oxygen-rich air into the combustion chamber effectively increases the compression pressure, which in turn, leads to an earlier start of combustion because of the combustible mixture reaching its auto ignition temperature at an earlier point in time. This phenomenon leads to more thorough combustion of the fuel and also generally leads to higher exhaust temperatures. Higher exhaust temperatures, in turn, lead to a greater oxidation rate of the soluble organic fraction thus further lowering the level of undesirable particulate matter emission from the engine.

SUMMARY OF THE INVENTION

With the foregoing discussion in mind, it is an object of the present invention to provide a mechanical power plant and the method of making the same for use both in on-road and off-road applications, in which the exhaust emissions from the modified diesel engine component of the apparatus are substantially reduced.

Another object of the invention is to provide a mechanical power plant of the aforementioned character which includes a specially modified, conventional two-stroke uniflow-scavenged diesel engine that has a longer than normal piston dwell time at top dead center, has a lower than normal exhaust valve lift and a shorter than normal exhaust valve open time, which modifications effectively increase the amount of residual exhaust gases remaining in the combustion chamber following the scavenge stroke.

Another object of the invention is to provide a modified diesel engine of the aforementioned character in which the pistons have been modified to accommodate for a longer connecting rod and in which the piston crown has been modified to increase the turbulence of the fuel-air mixture entering the combustion chambers of the engine.

Another object of the invention is to provide a modified engine of the character described in the preceding paragraph in which the connecting rods have been lengthened so as to maintain the same distance between the center of the crankshaft and the top of the pistons as existed in the unmodified engine.

Another object of the invention is to provide a modified diesel engine in which the inlet ports of the cylinder liners have been modified in a manner to create a novel swirling effect of the air entering the combustion chambers of the engine.

Another object of the invention is to provide a mechanical power plant as described in the preceding paragraphs which provides for a greater than normal flow of oxygen-rich air into the combustion chamber of the modified diesel engine so as to accomplish more complete and efficient combustion of fuel and, at the same time, accelerate the oxidation of the soluble organic fraction, that is the unburned lubricating oil and fuel fraction formed in the exhaust system and trapped on the particulate emission sampling filter.

Another object of the invention is to provide a unique mechanical power plant in which the nitrogen oxide emissions exhausted from the diesel engine component are effectively maintained at levels below those set by the air quality regulatory agencies.

These and other objects of the invention are achieved by the novel power generating apparatus of the invention, one form of which is more fully described in the paragraphs which follow.

BRIEF DESCRIPTION OF THE DRAWINGS

FIG. 1 is a side-elevational view of a prior art piston and connecting rod of the character that was modified to create an alternate form of modified engine of the present invention.

FIG. 2 is a side-elevational view of a piston and connecting rod showing the modified piston and connecting rod of one form of the present invention.

DESCRIPTION OF THE INVENTION

Figure 4:
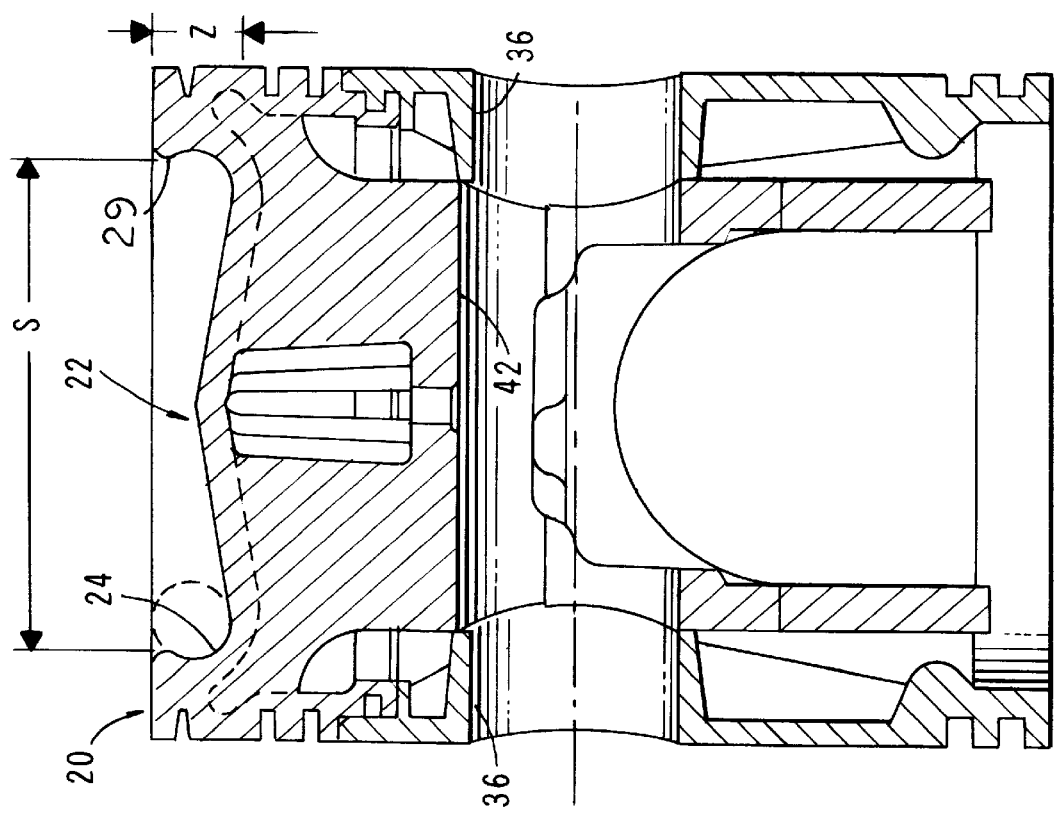
FIG. 4 is an enlarged, cross-sectional view taken along lines 4—4 of FIG. 2 showing the modified piston configuration shortened by the distance "D" (FIG. 3).

Referring to the drawings and particularly to FIGS. 1 and 2 a piston and connecting rod of a baseline engine of the character that was modified in accordance with the method of the present invention is there illustrated. In this instance the modified engine is a modification of an engine manufactured and sold by Detroit Diesel under the serial number 6VF-118287 (the '287 baseline engine). This particular engine is also of a character well-known of those skilled in the art and includes a turbocharger component and a diesel engine component. The diesel engine component of this baseline power plant has a combustion stroke and a scavenge stroke and includes one or more valves for opening and closing exhaust ports provided in the combustion chamber. Additionally this baseline diesel engine component also has a camshaft for operating the valve, a fuel injector for injecting fuel into the combustion chamber and injection timing control means which typically comprises a cam profile and a set of cams for timing the injection of the fuel into the combustion chamber. The construction and operation of the second baseline engine is well known by those skilled art.

The '287 baseline engine comprises a compression ignited, two-stroke diesel engine of the type having a compression/combustion stroke and includes a combustion cylinder defined by a cylinder having a central axis and a cylinder wall extending generally parallel to the central axis. A plurality of air inlet ports having side walls and an exhaust outlet port are formed in the cylinder wall. Additionally, the engine includes a piston, which is reciprocally movable within the combustion cylinder and includes a combustion bowl of a first depth and a first diameter formed in the piston crown. A valve is provided for opening and closing the exhaust outlet port and an injector is provided for injecting fuel into the combustion chamber at a first spray angle. As in the earlier described embodiments of the invention, baseline engine '287 also includes a camshaft rotatable through an angle of 360 degrees for lifting the valve relative to the exhaust port by approximately 0.33 inches, with the camshaft opening the exhaust valve at an angle of about 55 degrees.

The improved power plant of this latest embodiment of the invention further comprises a turbocharger means of the character shown in FIG. 1 of incorporated by reference U.S. Pat. No. 5,746,163. This turbocharger means comprises a conventional blower and a turbocharger component of the character previously described. The power plant of this second form of the invention operates in basically the same a manner as the modified engine of the embodiment shown in FIGS. 1 through 8 of U.S. Pat. No. 5,746,163 and as previously described herein.

The first step in the method of this latest form of the invention to modify the '287 baseline engine was to substitute the camshaft thereof with the camshaft discussed in incorporated by reference U.S. Pat. No. 5,746,163 (the '163 patent). As discussed in the '163 patent, this camshaft evidences an exhaust valve cam profile that essentially reduces the exhaust valve lift by approximately 0.047 inches and also retards the opening of the exhaust valve and advances its closing. As in the engine described in the '163 patent, modified engine, these changes effectively reduce the scavenge rate, thus increasing the volume of residual exhaust gases remaining in the cylinder during the compression/combustion/power stroke. This, in turn, tends to increase compression temperature and consequently tends to increase peak combustion temperature. To offset this effect, the compression ratio was, once again, reduced from its original value of the 17:1 to the value of 15:1. The combination of these two changes to the second baseline engine had the desired beneficial effect of reducing the emission of nitrogen oxides from the engine.

Another important change made to the '287 baseline engine in accordance with the method of the invention concerns the substitution of the cylinder liner of the engine with a cylinder liner having inlet ports of a reduced height of approximately 0.85 inch rather than the cylinder liner of the '287 baseline engine which had inlet ports having a height of 0.95 inch. During engine operation this change in port height causes the smaller port to be covered sooner by the rising piston which, in turn, causes more residual gases to be trapped inside the cylinder and thus furthers the effect caused by the change in the exhaust camshaft profile. In short, the new camshaft profile coupled with the smaller liner ports will cause significantly more residual gases to remain in the cylinder during the compression/combustion/ power stroke. This effect combined with the reduced compression ratio results in the modified engine of the invention exhibiting markedly lower nitrogen oxide emissions.

Figure 7:
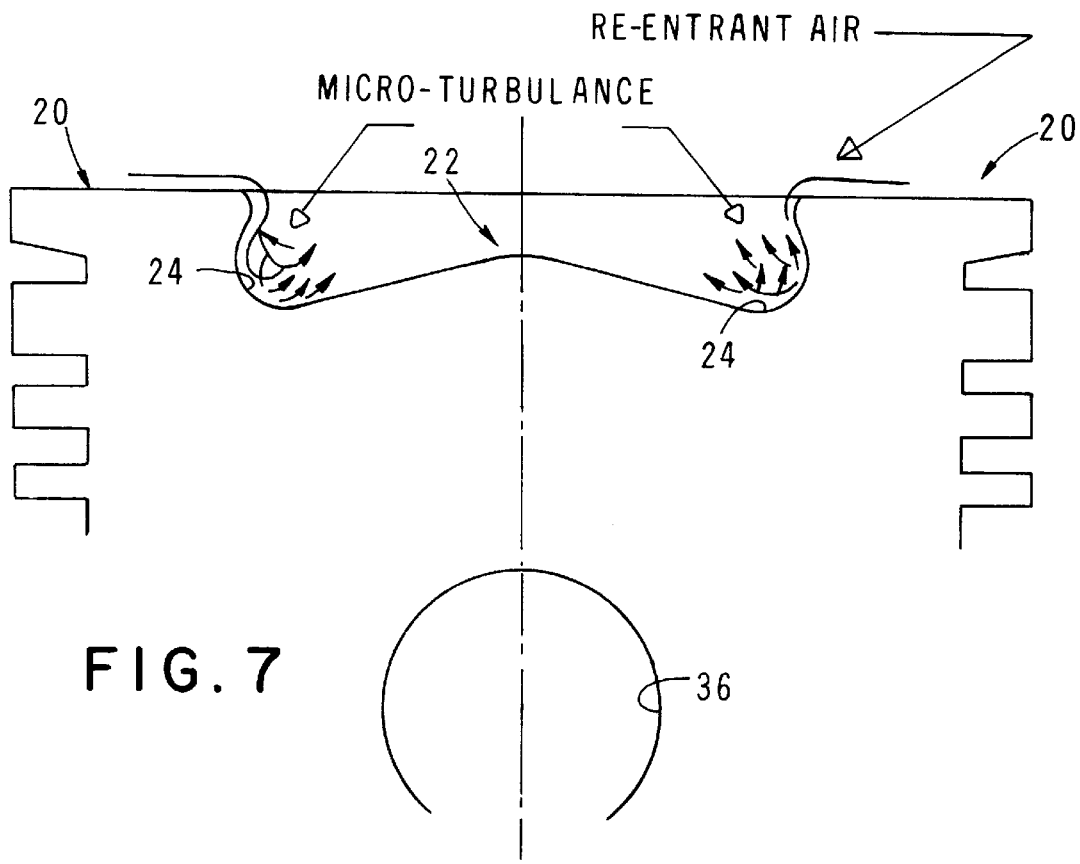
FIG. 7 is an enlarged diagrammatic view illustrating the effect of the modified piston of the present invention on a re-entrant air introduced into the engine.

Additional changes made to the '287 baseline engine in accordance with the latest method of the invention included substantial modifications made to the piston of the engine, the character of which will now be discussed. Turning particularly to FIGS. 1 and 2, the configuration of the prior art '287 baseline engine piston is there illustrated. By comparing the piston configuration shown in FIGS. 1 and 2 with the piston configuration of the modified engine of the invention as shown in FIGS. 4 and 7 it can be seen that substantial changes have been made in the configuration of the combustion bowl formed in the piston crown. More particularly, as shown in FIG. 4, the modified piston 20 of the modified engine of the invention includes a combustion bowl 22 of a substantially different configuration from that of the prior art piston shown in FIG. 2. For example, the diameter "R" of the combustion bowl "CB" of the prior art piston is substantially larger than the diameter "S" of the combustion bowl 22 of the modified piston shown in figure 4. Additionally, the maximum depth X of the prior art combustion bowl is somewhat less than the maximum depth Z. of the combustion bowl 22 of the modified 20 piston shown in FIG. 4. Further, the peripheral portion 24 of the combustion bowl of the modified piston is substantially more rounded than the peripheral portion "PP" of the combustion bowl of the prior art piston as indicated by the dotted lines in FIG. 4.

Figure 6:
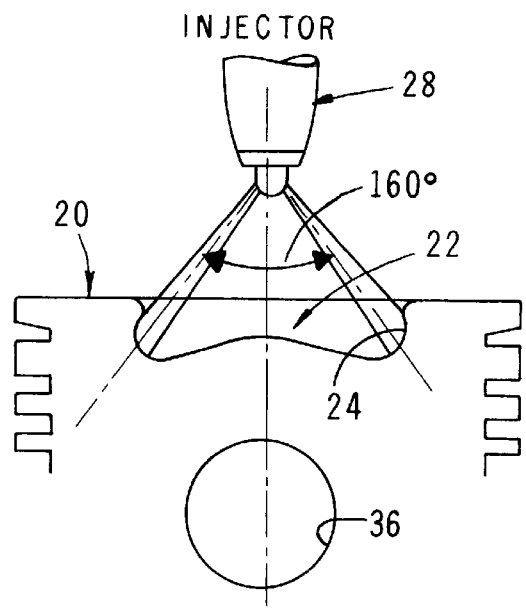
FIG. 6 is a diagrammatic view illustrating an alternate form of injector used in connection with the modified piston of the modified engine of the alternate form of the present invention.

Referring also to FIG. 7, it is to be observed that the rounder and deeper peripheral portion 24 of the combustion bowl of the modified piton tends to create an entirely different and vastly improved flow pattern of the a re-entrant air entering the piston bowl. More particularly, due to the unique configuration of the combustion bowl 22 of the modified piston, substantial microturbulence occurs within of the combustion bowl as the re-entrant air enters the peripheral portion of the combustion bowl in the manner illustrated in FIG. 7. As will be discussed in greater detail in the paragraphs with follow, this smaller diameter, deeper and more rounded peripheral portion functions to cause more efficient combustion of the fuel introduced into the combustion chamber by the engine injector 28 (FIG. 6).

Because of the change in the configuration of the combustion bowl of the modified piston as described in the preceding paragraphs, a change in the injector spray angle of the injector is necessary in order to optimize the spray pattern and maximize the benefit of charge mixing by spraying the fuel more efficiently over the uniquely formed combustion bowl 22 of the modified piston. More particularly by referring to FIGS. 5 and 6, it can be seen that the injector "I" of the prior art baseline engine provides a spray angle of about 165 degrees. However, as shown in FIG. 6, in order to accommodate the smaller diameter combustion bowl 22 of the modified piston 20, the spray angle of the modified injector 28 is reduced to an angle of approximately 160 degrees. The optimized spray angle of the modified injector 28 of the second modified engine of the present invention also functions to encourage evaporation and, at the same time, facilitates the mixing of the fuel and air through assistance from the micro-turbulent flow of the re-entrant air into the combustion chamber as illustrated in FIG. 7.

Figure 3:
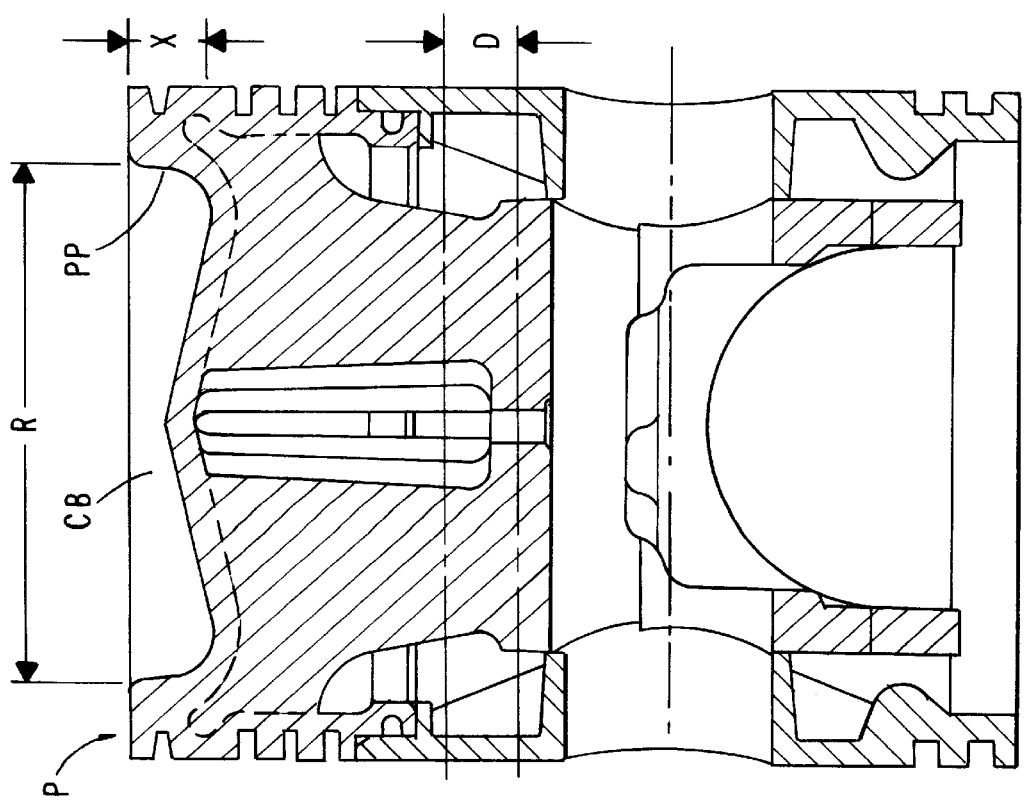
FIG. 3 is an enlarged, cross-sectional view taken along lines 3—3 of FIG. 1 showing the prior art piston configuration.
Figure 5:
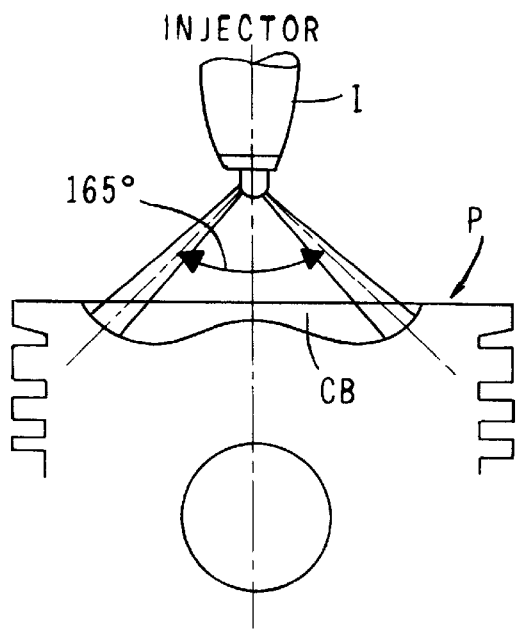
FIG. 5 is a generally diagrammatic view illustrating a prior art form of the injector used with the prior art engine which engine was modified to create the modified engine of the alternate embodiment of the present invention.
Figure 8:
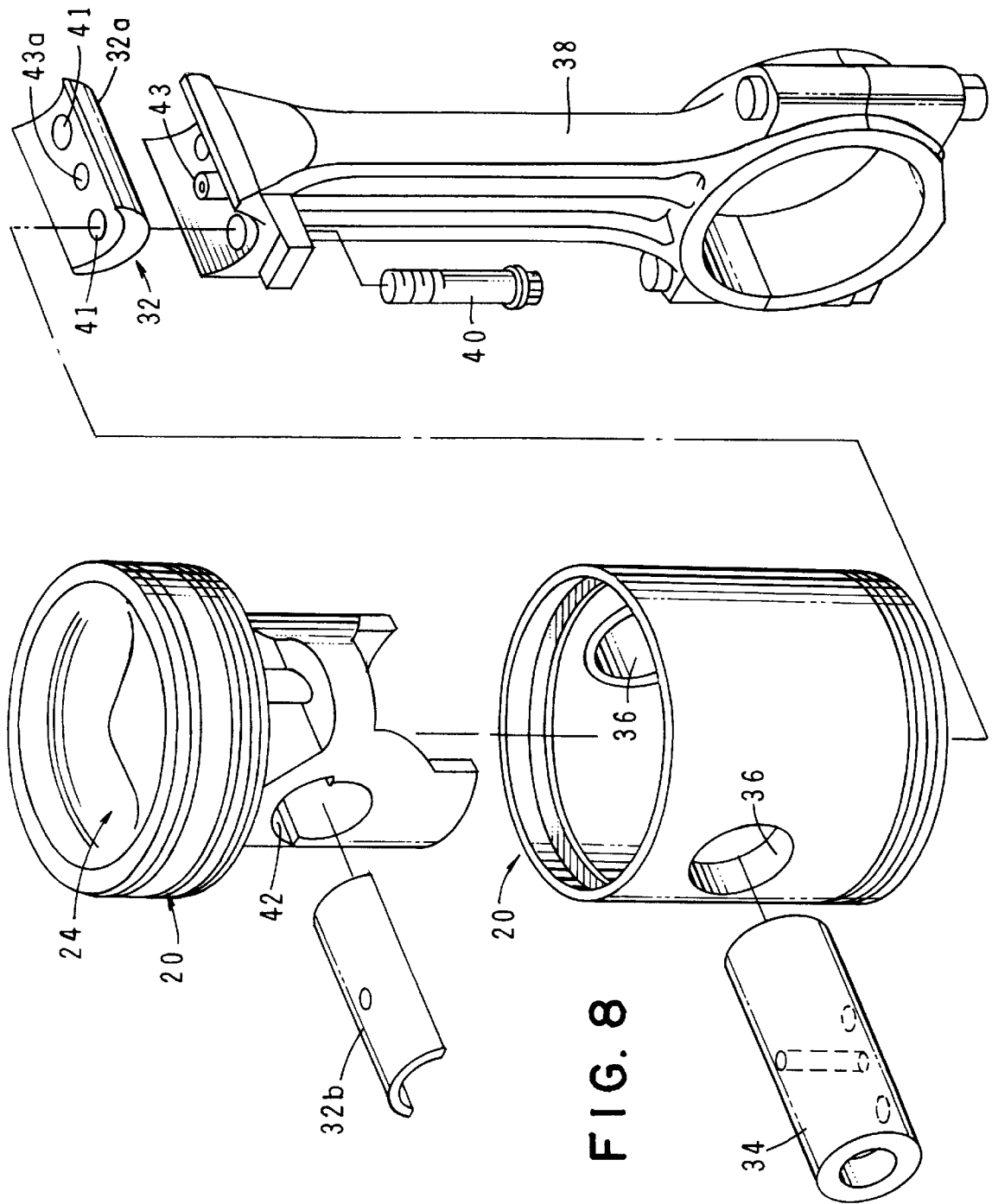
FIG. 8 is a generally perspective, exploded view of one form of the modified piston and connecting rod of the modified engine of the present invention.
Figure 9:
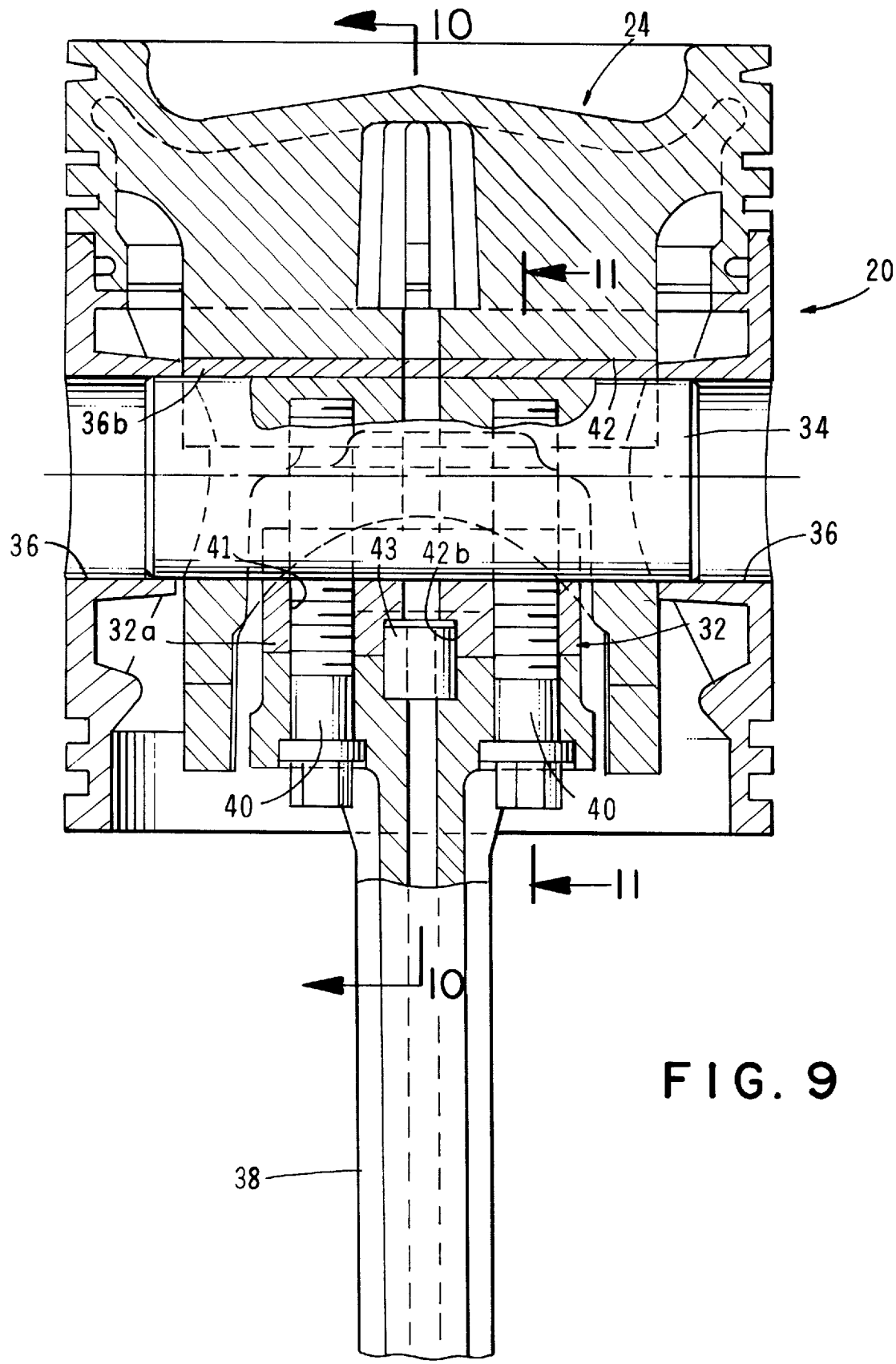
FIG. 9 is a cross-sectional view similar to FIG. 4 showing the modified piston of the invention connected to the modified connecting rod of the invention.
Figure 11:
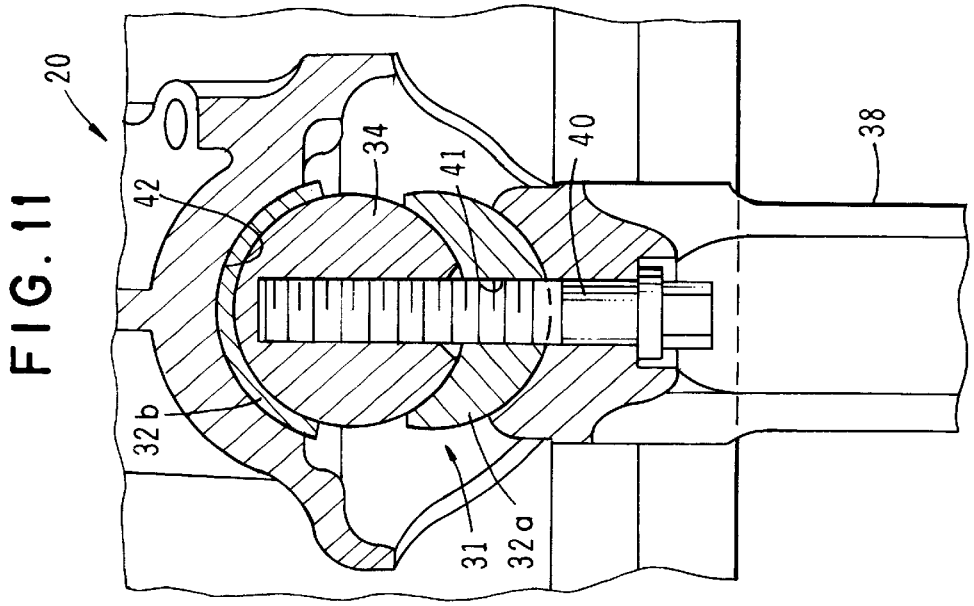
FIG. 11 is a cross-sectional view taken along lines 11—11 of FIG. 9.
Figure 10:
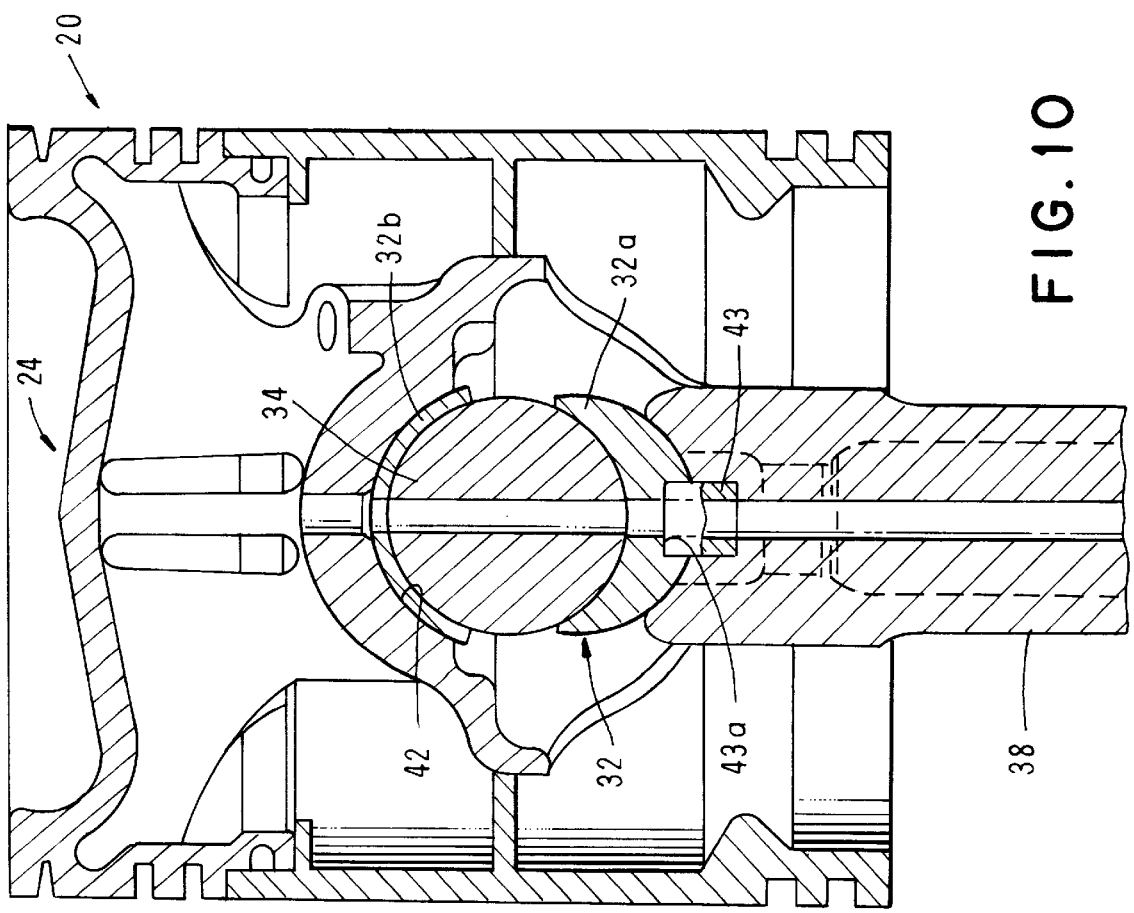
FIG. 10 is a cross-sectional view taken along lines 10—10 of FIG. 9.
Figure 12:
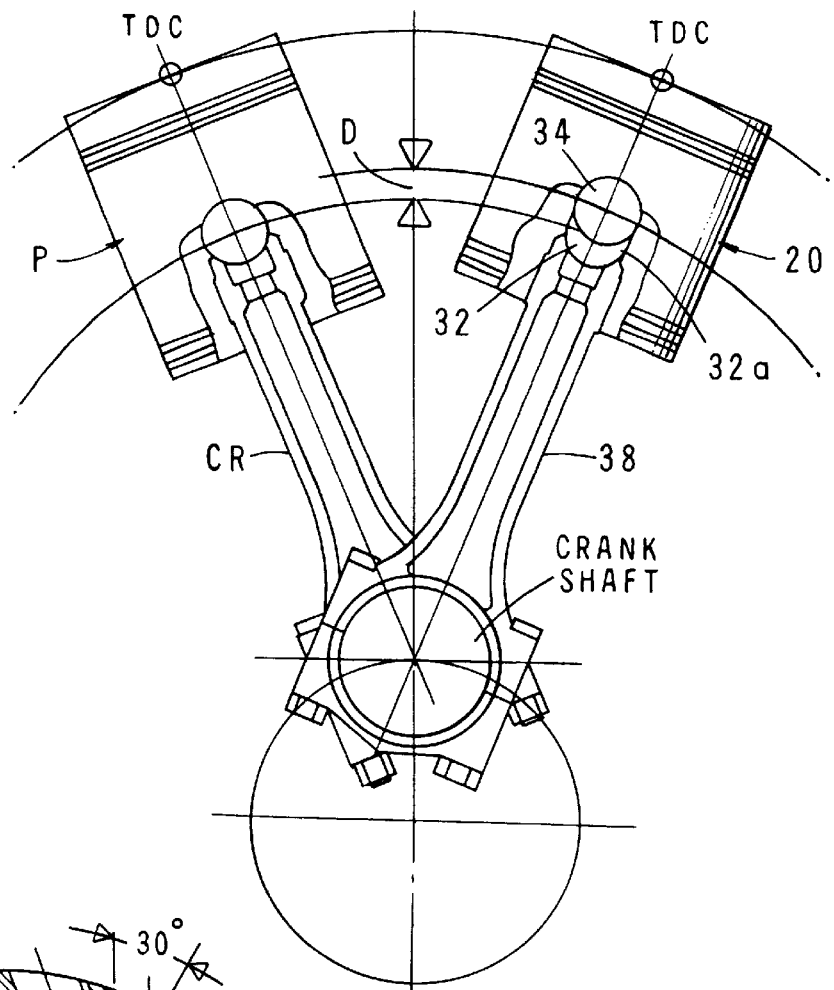
FIG. 12 is a generally diagrammatic view illustrating on the left the travel of the conventional piston and connecting rod and showing on the right the travel of the modified piston and connecting rod of the present invention.

In addition to modifying the combustion bowl of the piston of the baseline engine, other substantial modifications were also made to the piston and connecting rod. For example, as can be seen by referring to FIGS. 1 and 2, the effective length of the connecting rod of the modified engine was increased and the upper, or crown portion of piston 20 of the modified engine was correspondingly shortened to accommodate for the longer connecting rod. More particularly, as indicated in FIGS. 2 and 3, the connecting rod was effectively lengthened by the distance "D" and the crown portion of the piston "P" of the baseline engine was shortened by a corresponding distance "D" to create the modified piston 20 shown in FIG. 4. Lengthening of the connecting rod "CR" was here accomplished through the use of an adapter assembly generally identified in the drawings by the numeral 32. This adapter assembly 32, which comprises the adapter means of the invention for effectively lengthening the connecting rod, cooperates with a wrist pin 34 (FIG. 8) which is receivable within opposing bores 36 formed in the modified piston 20. In the present form of the invention, the adapter means comprises a lower shim component 32*a* which is interconnected with connecting rod 38 by means of threaded connectors 40 (FIGS. 8 and 9). Connectors 40 are adapted to threadably engage internally threaded bores 41 formed in member 32*a* and also threadably engage wrist pin 34 in the manner shown in FIG. 9. Adapter 32*a* is centered with respect to the connecting rod by a protuberance 43 which is received within a bore 43*a* formed in component 32*a* (FIG. 8). Also forming a part of the adapter means of the invention is a second shim-like member 32*b* which is received within a generally semi-circular shaped opening 42 formed in internal wall 44 of the modified piston 20. As indicated in FIG. 8, shim-like member 32*b* is generally semi-circular in cross-section and slides into semi-circular recess 42 in the manner indicated in FIG. 8. It is apparent that if shim-like member 32*a* is constructed so as to have a maximum thickness which corresponds to the distance "D" by which the crown of the piston was foreshortened, the maximum throw of the modified piston will be the same as the maximum throw of the prior art piston (see FIG. 12). Stated a different way, by using the adapter means of the invention, the distance "D-1" from the axis of rotation of the crankshaft to the top of the piston "P" will be the same as the distance "D-2" of the modified assembly, which is the distance between the axis of rotation of the crankshaft and the top of the modified piston 20 (see FIGS. 1 and 2).

The novel effect of the modification described in the preceding paragraphs resides in the fact that, because of the lengthened connecting rod, travel of the modified piston toward top dead center and toward bottom dead center will be accelerated and there will be more crank angle (dwell) close to and at top dead center. Additionally, it is important to note, with this novel modified piston and connecting rod arrangement, dwell time of the piston at top dead center will be slightly longer than in the baseline engine, therefore permitting a more complete combustion of the fuel. Stated another way, because of the use of the novel adapter means of the invention, the effective overall length of the connecting rod will be increased which, in turn, will cause the piston to accelerate upwardly and downwardly more rapidly than is the case with the baseline engine. Accordingly, when the piston reaches the top of the stroke, it will have a slightly longer duration or dwell time than is true in the conventional, unmodified baseline engine. It is this longer dwell time that enables the more complete combustion of the combustible gases introduced into the combustion chamber. However, it is apparent that by increasing the length of the connecting rod assembly to achieve the faster acceleration, the crown portion of the piston must be foreshortened in order to maintain the same overall length of the assemblage comprising the connecting rod and piston assembly.

In operation of the modified engine of the present invention, when the piston is at or near top dead center, the combustible mixture is at its highest pressure and temperature. This condition is considered ideal for the chemical energy stored in the combustible mixture to be converted to mechanical energy (pressure applied to the piston crown). By increasing the dwell, more time for the conversion (from chemical to mechanical energy) process is allowed. Therefore, more complete combustion is achieved. This method leads to lower fuel consumption as well as lower particulate matter than in the conventional case.

It is to be understood that while the distance "D" can vary depending on the end use to be made of the engine, an increase in length of the connecting rod assembly of approximately one-half inch and a corresponding decrease in the overall length of the crown portion of the piston 20 of the modified engine by one-half inch appears to achieve optimum acceleration and dwell time objectives. It is also to be understood that the modifications made to the piston and connecting rod assembly as described in the preceding paragraphs, do not effect the operation of the engine valves and modification of the engine block is not required.

As discussed in incorporated by reference application Ser. No. 09/140,356, the air charging and scavenging processes are significantly impacted by change in the design of the inlet ports of the cylinder liner. In accordance with this latest method of the invention, the cylinder liner was modified in a similar manner to that described in the incorporated by reference application to provide a modified cylinder liner 50 having inlet ports 52 of the same size, namely about 0.85 inches in height, but uniquely skewed to the right from vertical by approximately 14 degrees (see FIG. 13). This change was combined with a change in the tangential inclination of the ports to provide a modified tangential inclination of approximately 30 degrees as illustrated in FIGS. 13 through 16. These changes in the cylinder liner port configuration function to optimize the flow pattern of gases flowing through the cylinder by creating a novel swirl type motion of the character depicted by the arrows 55 of FIG. 14. This swirl motion markedly improves scavenging and therefore, reduces particulate matter emissions and also reduces fuel consumption as well as particulate matter due to better mixing of fuel and air.

Figure 16:
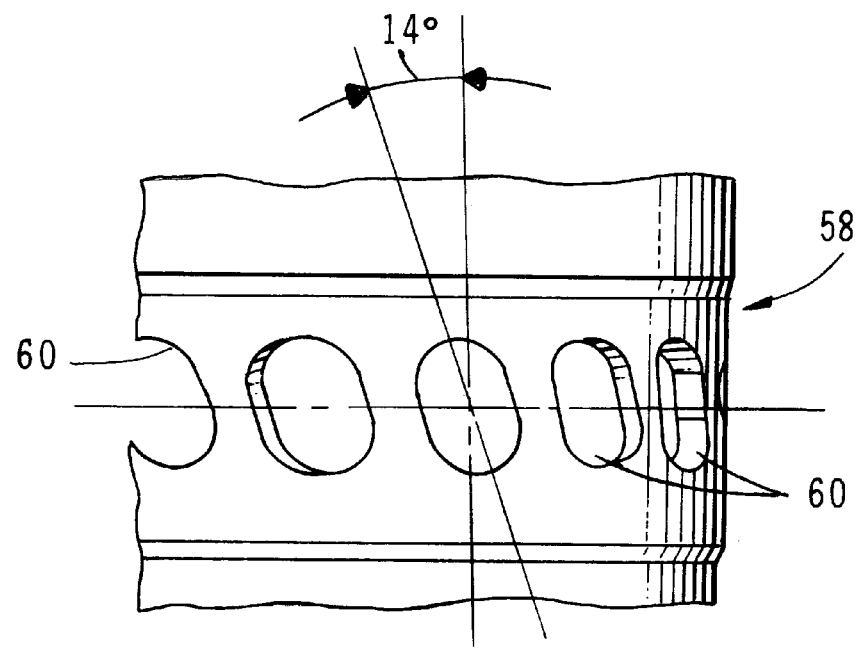
FIG. 16 is a fragmentary view similar to FIG. 15, but showing still another form of cylinder liner of the modified engine of the present invention having still differently configured inlet ports.

Turning to FIG. 16, still another form of the modified cylinder liner of the engine of the present invention is there illustrated. This cylinder liner, which is generally designated by the numeral 58, is similar and many respects to the modified cylinder liner 52 illustrated and FIGS. 15,16 and 17. However as indicated in FIG. 16 the ports 60 of modified liner 58 are skewed to the left rather than to the right, but otherwise have the same general configuration has the ports of modified cylinder liner 52. This configuration of the liner, of course, produces a novel swirl type motion in the opposite direction and also improves scavenging and reduces particulate matter emissions also through improved mixing of fuel and air.

By way of summary, the method of this latest form of the invention comprises the steps of modifying the piston, the connecting rod, the camshaft, the cylinder liner and the injector of the baseline engine as described in the preceding paragraphs in a manner to improve scavenging and to reduce particulate matter emissions. The camshaft modification causes opening and closing of the exhaust valve so as to allow, after the combustion stroke, a buildup of exhaust gases within the cylinder in a quantity sufficient to absorb combustion heat to an extent to limit the combustion temperature to a temperature that will limit the formation of nitrogen oxide to a degree that, following the combustion stroke, the exhaust gases formed will contain nitrogen oxide in an amount less than about 6.0 g/bhp-hr. and to limit the formation of particulate matter within the combustion gases to an amount less than about 0.1 g/bhp-hr. Additionally, in accordance with the method of this latest form of the invention, the camshaft is modified in a manner to limit opening of the exhaust valve following the combustion stroke to a distance no greater than about 0.28 inches.

The modification of the cylinder sleeve of the second baseline engine involves modifications to the inlet ports of the cylinder liner to reduce the height of the ports and also to markedly skew them at an angle relative to the central axis of the cylinder of between about 12 and 16 degrees. Additionally, the method of this latest form of the invention also includes the step of tangentially inclining the walls of the inlet ports formed in the cylinder sleeve.

Figure 14:
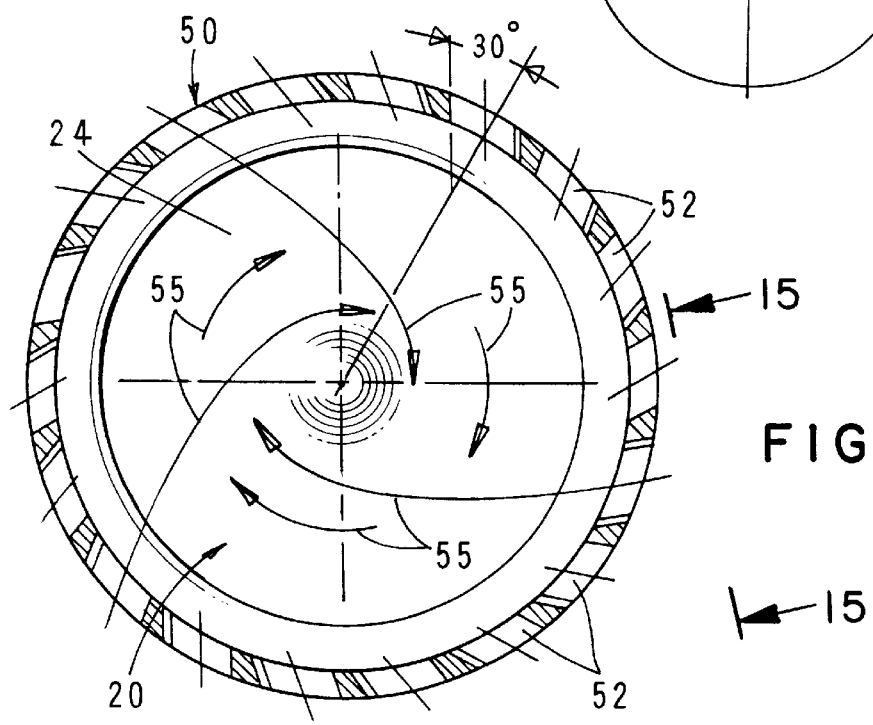
FIG. 14 is a cross-sectional view taken along lines 14—14 of FIG. 13 illustrating the flow pattern of gases entering the combustion chamber.
Figure 13:
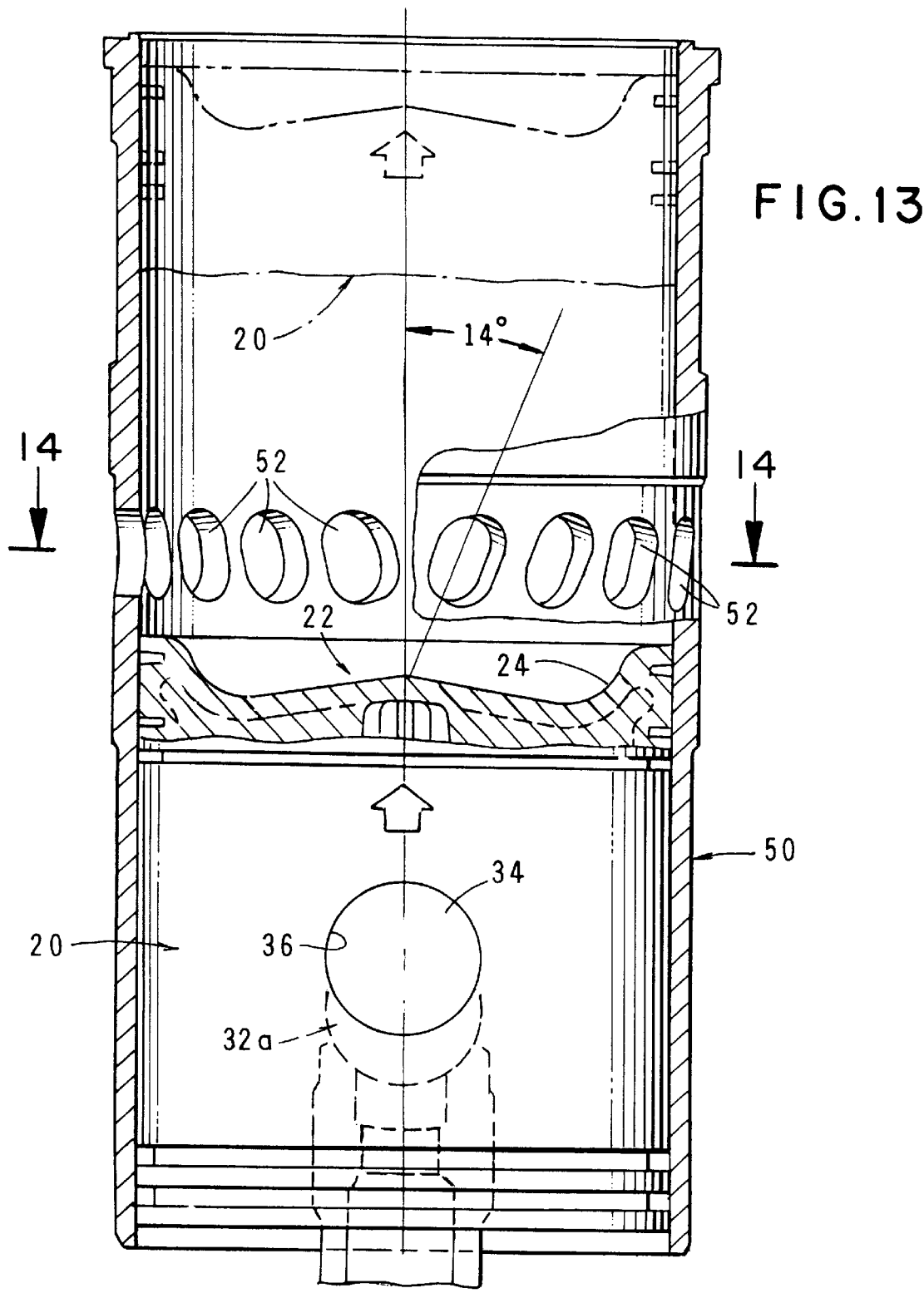
FIG. 13 is an enlarged, cross-sectional view of one form of modified cylinder liner of the modified engine of the present invention.
Figure 15:
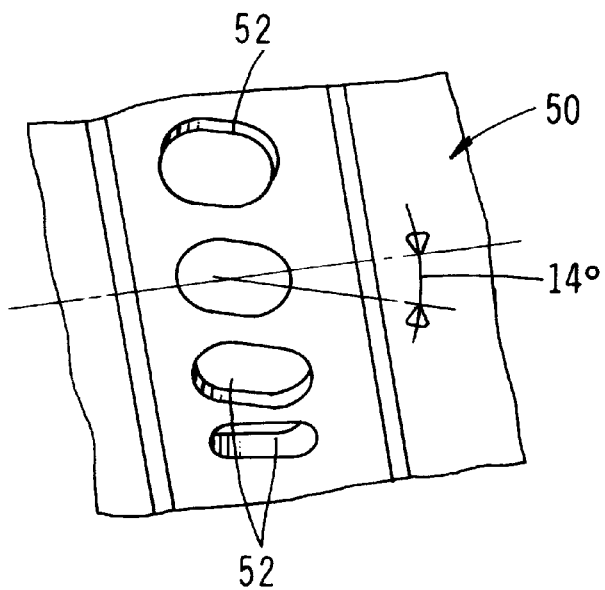
FIG. 15 is a view taken along lines 15—15 of FIG. 14.

Another important aspect of the method of this latest form of the invention comprises the modification of the combustion bowl of the piston of the second baseline engine. This modification involves reducing the diameter of the combustion bowl of the baseline engine and also changing its shape to provide a peripheral portion having walls exhibiting a radius of curvature 24 (FIG. 4) substantially less than the radius of curvature of the peripheral portion of the combustion bowl "CB" of the baseline engine (FIG. 3). More particularly, the peripheral portion 24 of the combustion bowl of the modified piston is generally semi-toroidal with the entrance to the combustion bowl defining an inturned, squish-like lip 29. As previously mentioned and as is illustrated in FIG. 14, this novel shape of the peripheral portion of the combustion chamber of the piston of the modified engine functions to increase micro-turbulence within the combustion bowl in the manner illustrated by the arrows in FIG. 7.

Still another important aspect of this latest form of the method of the invention includes the step of modifying the injector so as to inject fuel into the combustion chamber at a rate and in a spray pattern designed to maximize the benefit of charge mixing by spraying the fuel over a larger hot surface area of the combustion bowl. This action, in turn, encourages full evaporation of the fuel and facilitates mixing of the fuel with air as a result of the micro-turbulent motion of the re-entrant air as it flows into the combustion bowl.

Finally, the method of this last form of the invention involves increasing the effective length of the connecting rod assembly to achieve greater piston acceleration and increased piston dwell time at top dead center to achieve more complete fuel combustion. As previously discussed all of these various modifications to the baseline engine combine to produce a modified engine having superior operating characteristics and markedly improved emission characteristics.

Having now described the invention in detail in accordance with the requirements of the patent statutes, those skilled in this art will have no difficulty in making changes and modifications in the individual parts or their relative assembly in order to meet specific requirements or conditions. Such changes and modifications may be made without departing from the scope and spirit of the invention, as set forth in the following claims.

I claim:

1. A method of making an improved low emission mechanical power plant by modifying a baseline, compression ignited, two stroke diesel engine of the type having a compression/combustion stroke and including a combustion cylinder defined by a cylinder liner having a central axis and a plurality of air inlet ports having side walls, said combustion cylinder having an exhaust outlet port; a piston having an upper portion of a first length reciprocally movable within the combustion cylinder by a connecting rod assembly of a first overall length, said piston having a combustion bowl of a first diameter; a valve for opening and closing the exhaust outlet port; and injector for injecting fuel into the combustion chamber at a first spray angle; and a camshaft rotatable through an angle of 360 degrees for lifting the valve relative to the exhaust port, the method comprising the steps of:

(a) modifying the camshaft of the baseline compression ignited, two stroke diesel engine to cause opening and closing of the exhaust valve in a manner to allow, after said combustion stroke, a buildup of exhaust gases within said cylinder in a quantity sufficient to absorb combustion heat to an extent to limit the combustion temperature to a temperature that will limit the formation of nitrogen oxide to a degree that, following the combustion stroke, the exhaust gases formed will contain nitrogen oxide an amount less than 6.0 grams per brake horsepower-hour;

(b) modifying the cylinder liner and the combustion bowl of the piston of the baseline compression ignited, two-stroke engine in a manner to limit the formation of particulate matter within the combustion gases to an amount less than about 0.1 grams per brake horsepower-hour; and (c) modifying the connecting rod assembly to provide a connecting rod assembly having a second overall length greater than said first overall length of the connecting rod assembly of baseline engine, whereby piston travel within the modified engine will be accelerated.

2. A method as defined in claim 1 including the step of modifying the piston to provide a piston having an upper portion having a second length less than said first length of the upper portion of the piston of the baseline engine.

3. A method as defined in claim 1 including the step of opening the exhaust valve following the combustion stroke by a distance no greater than about 0.28 inches.

4. A method as defined in claim 1 in which modifying the cylinder liner includes the step of modifying the air inlet ports of the cylinder liner by skewing the inlet ports at an acute angle relative to the central axis of the cylinder liner.

5. A method as defined in claim 4, in which modifying the cylinder liner includes the further step of tangentially inclining the walls of the inlet ports.

6. A method as defined in claim 4 in which modifying the cylinder liner includes the step of skewing the inlet ports at an acute angle of between about 12 and 16 degrees.

7. A method as defined in claim 4 in which modifying the combustion bowl of the piston includes the step of providing a combustion bowl having a second diameter less than the first diameter of the piston of the baseline engine and having a configuration which results in an increase in turbulence of gases introduced into the combustion bowl.

8. A method as defined in claim 7 including the further step of modifying the injector of the base line to provide an injector having a second spray angle less than the first spray angle of the injector of the baseline engine.

9. A method as defined in claim 7 in which modifying the baseline engine produces a power plant in which the exhaust gases formed thereby will contain hydrocarbon emissions less than 0.40 g/bhp-hr and carbon monoxide less than 0.50 g/bhp-hr.

10. A method of making an improved low emission mechanical power plant by modifying a baseline, compression ignited, two stroke diesel engine of the type having a compression/combustion stroke and including a combustion cylinder defined by a cylinder having a central axis and a plurality of air inlet ports having side walls and an exhaust outlet port; a piston reciprocally movable within the combustion cylinder, said piston having an upper portion of a first length and a combustion bowl of a first diameter; a connecting rod assembly of a first length; a valve for opening and closing the exhaust outlet port; and injector for injecting fuel into the combustion chamber at a first spray angle; and a camshaft rotatable through an angle of 360 degrees for lifting the valve relative to the exhaust port, the method comprising the steps of:

(a) modifying the camshaft of the baseline compression ignited, two stroke diesel engine to cause opening and closing of the exhaust valve in a manner to allow, after said combustion stroke, a buildup of exhaust gases within said cylinder in a quantity sufficient to absorb combustion heat to an extent to limit the combustion temperature to a temperature that will limit the formation of nitrogen oxide to a degree that, following the combustion stroke, the exhaust gases formed will contain nitrogen oxide an amount less than 6.0 grams per brake horsepower-hour and to limit the formation of particulate matter within the combustion gases to an amount less than about 0.1 grams per brake horsepower-hour;

(b) modifying the air inlet ports of the cylinder sleeve by skewing the inlet ports thereof at an acute angle relative to the central axis of the cylinder sleeve and by tangentially inclining the walls of the inlet ports;

(c) modifying the combustion bowl of the piston of the baseline engine to reduce the diameter thereof and to change the configuration thereof to provide a rounded peripheral portion tending to create micro-turbulence within gases introduced into the combustion bow;

(d) modifying the connecting rod assembly to provide a connecting rod assembly having a second length greater than said first length of the connecting rod assembly of the baseline engine; whereby piston travel within the modified engine will be accelerated; and (e) modifying the piston to provide a piston having an upper portion having a second length less than said first length of the upper portion of the piston of the baseline engine.

11. A method as defined in claim 10 in which the inlet ports are skewed at an acute angle of between about 12 and 16 degrees.

12. A method as defined in claim 10 including the step of opening the exhaust valve following the combustion stroke by a distance no greater than about 0.28 inches.

13. A method as defined in claim 10 including the further step of modifying the injector or by providing an injector having a second spray angle less than the first spray angle.

* * * * *